March 25, 1924.
S. B. NEWBERRY
1,488,055
KILN FOR RECOVERY OF BY PRODUCTS FROM FUEL
Filed Nov. 30, 1920
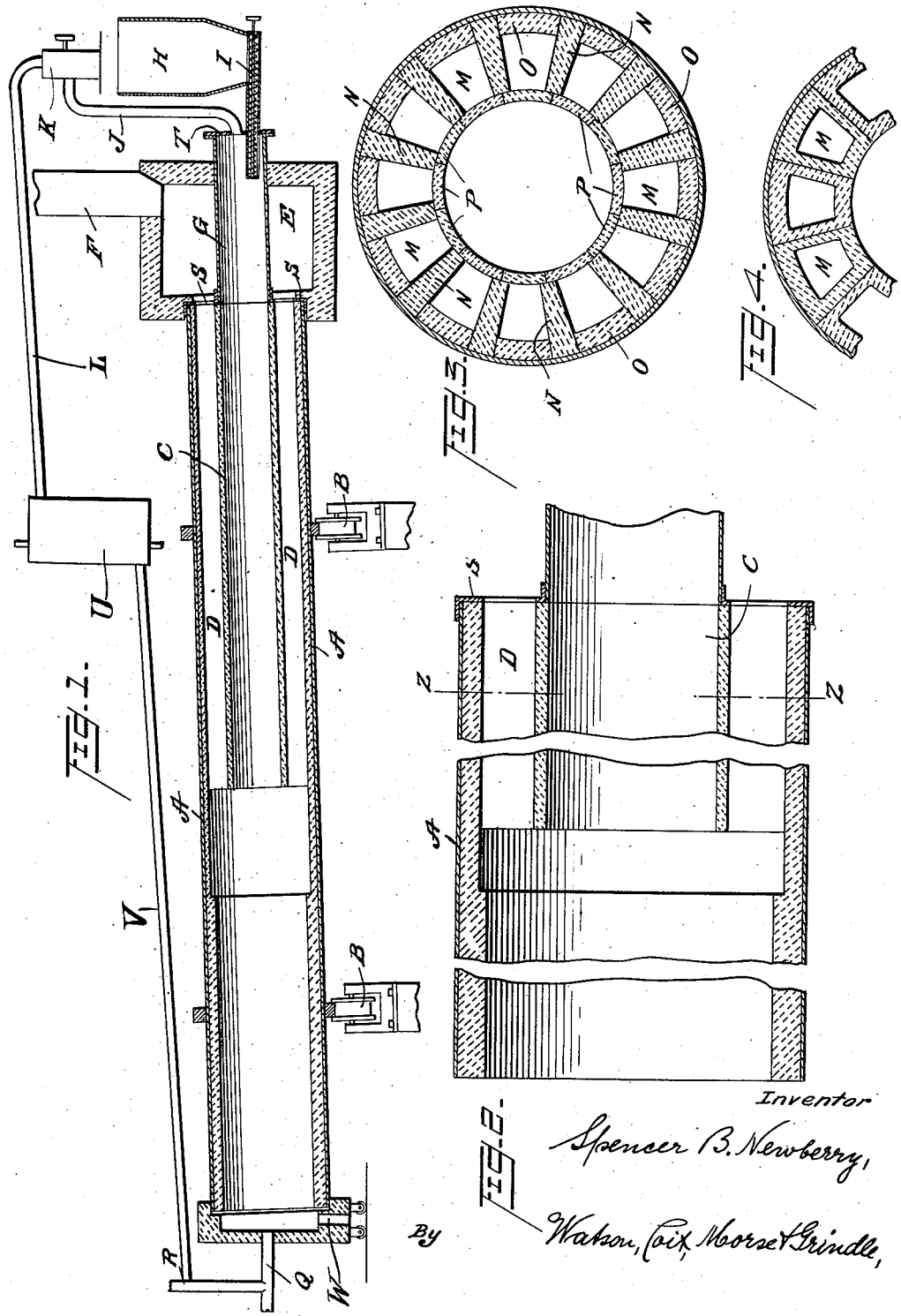

Patented Mar. 25, 1924.

1,488,055

UNITED STATES PATENT OFFICE.

SPENCER B. NEWBERRY, OF CLEVELAND, OHIO; ANDREW W. NEWBERRY, EXECUTOR OF SAID SPENCER B. NEWBERRY, DECEASED, ASSIGNOR OF ONE-HALF TO ANDREW W. NEWBERRY AND ONE-HALF TO ARTHUR C. NEWBERRY.

KILN FOR RECOVERY OF BY-PRODUCTS FROM FUEL.

Application filed November 30, 1920. Serial No. 427,313.

*To all whom it may concern:*

Be it known that I, SPENCER B. NEW-BERRY, a citizen of the United States, residing at Cleveland, in the county of Cuyahoga and State of Ohio, have invented certain new and useful Improvements in Kilns for Recovery of By-Products from Fuel, of which the following is a specification.

This invention relates to an apparatus for the calcination of any materials requiring exposure to high temperature, as in the manufacture of cement, phosphate, semifused clay clinker, the nodulizing of iron ore, and in other industries in which the calcination is ordinarily effected by the use of coal in the form of coal dust or producer gas. In practically all of these processes as at present carried on bituminous coal is used in a raw state and the possible valuable by-products obtained by the distillation of this coal at moderate temperatures, such as oil and ammonia, are completely lost. By means of the kiln which is hereinafter described, this bituminous coal or other solid fuel is exposed first to a moderate temperature by indirect heat from the final combustion of the fuel, and in this preliminary heating the products of distillation of the fuel are kept separate from the gaseous products of its final combustion and are drawn off, condensed and recovered. The mixture of the residue of the fuel, containing fixed carbon, and the material to be calcined, after passing through this preliminary stage of heating, is then discharged into the lower section of the kiln where it is brought to high temperature by the combustion of the residual carbon. The highly heated gaseous products of this combustion give up a large part of their heat to the material in its preliminary stage of heating, and finally pass out through the stack. The calcined product is discharged continuously at the lower end of the kiln.

The novel features will be understood from the following description and claims taken in connection with the drawings.

In the drawings:

Figure 1 is a longitudinal vertical section through a kiln embodying my invention.

Figure 2 is a similar view enlarged, partly broken away, showing merely the tube arrangement in the kiln.

Figure 3 in a cross section on the line Z—Z of Figure 2; and

Figure 4 is a similar cross section showing a portion of a modified construction and connection of the concentric cylinders.

The kiln, shown in the accompanying drawing somewhat diagrammatically, includes an outer cylinder A A, preferably slightly inclined from the horizontal, and lined with refractory material. This cylinder is carried on rollers B B, and caused to rotate at any desired speed by means of gearing not shown in the drawing. In the upper portion of the kiln is an interior cylinder C, of smaller diameter than the kiln A A, also composed of refractory material, and separated from the kiln A A by the annular space D D, which is divided into longitudinal flues M M, shown in cross section in Figure 3. This inner cylinder may be of any desired length relatively to the length of the kiln A A. In most cases, however, it will be advantageous that the inner cylinder should extend through approximately half the length of the kiln A A, this proportion varying with the material to be treated and the time and temperature of preliminary heating necessary. The inner cylinder C may be advantageously extended beyond the upper end of the kiln A A. This extension G may be made of metal, such for example as cast iron or sheet steel, and is secured to the upper end of the inner cylinder C at the termination of the kiln A A, by means of the flanged metal plate S S in which openings are formed corresponding to the flues M M. The products of the final combustion of the fuel in the lower part of the kiln pass through the space D D around the inner cylinder C and are discharged into the chamber E, from which they pass out through the stack F. In the chamber E these gases pass around the extension G of the inner cylinder C and heat the incoming charge of material and fuel which is introduced into the inner cylinder C from the hopper H by means of the feed conveyor I. The extension G is closed at its upper end by a stationary plate T which bears against the end of the cylinder G and carries the the exhaust pipe J and the feed conveyor I. The products volatilized from the fuel during the passage of the charge through the inner cylinder C are drawn out through the pipe J by the fan K and finally pass from the fan through the pipe L to some known form of condensing apparatus U where they are recovered by well-known methods. While I prefer to make the inner cylinder of refractory material as above stated, it will be understood that the invention in its broader sense is not limited to the use of that particular material since other suitable materials may be used which will properly stand the particular conditions of use contemplated.

The construction of the kiln may be seen in the enlarged longitudinal section of Figure 1 and cross section along the line Z Z in Figure 3 of the drawings. The kiln A A is lined with refractory brick in the usual manner below the end of cylinder C. The lining of the lower part of the kiln, which is the zone of highest heat, as shown in Figures 1 and 2, may be of greater thickness than that of the upper part containing the inner cylinder. The portion of the kiln containing the inner cylinder C may be lined with hollow tile of fire brick material so shaped as to contain in single units the outer lining of the kiln A A, the cylinder C and the partition walls between the flues M M, as illustrated in Figure 4. For the sake of simple construction and repairs I prefer however to build up these flues and inner cylinder by means of the circle brick O O as the lining of cylinder A A, the wedge brick N N as the division walls and the circle brick P P as inner cylinder C, as shown in Figure 3.

The operation of the apparatus is briefly as follows:

The material to be calcined is mixed or ground with the necessary fuel and stored in the hopper H. From this it is continuously fed by the conveyor I into the upper part G of the inner cylinder C. As this inner cylinder is part of and revolves with the kiln A A, the charge of mixed fuel and material passes gradually down through the inner cylinder and in its passage is gradually heated through the walls of the inner cylinder by the waste gases of the final combustion which pass through the space D D. In this preliminary heating, moisture, oil, ammonia and combustible gas are given off. These are drawn by the fan K through the pipe J and finally discharged from the fan through the pipe L to the condensing apparatus. The speed of the fan K is so adjusted as to draw off the products of this distillation as they are formed, without drawing any considerable portion of the products of combustion from the lower part of the kiln into the inner cylinder. It is understood however that if it is found desirable to draw a portion of these gaseous products of combustion through the inner cylinder to aid in the distillation, this can readily be accomplished by suitable regulation of the suction produced by the fan K.

The time during which the charge is exposed to the preliminary heating may be regulated by suitable adjustment of the length of the inner cylinder C, and also by adjustment of the inclination of the kiln and its speed of revolution. The temperature and time of preliminary heating are therefore under control and may be adjusted to suit the particular material to be treated.

The mixture containing the material to be calcined and the residual fixed carbon of the fuel is continuously discharged at the lower end of the inner cylinder C into the lower section of the kiln A A. At the discharge end of the kiln, provision is made for the burning of supplementary fuel, either the gas given off in the preliminary heating and carried to the front of the kiln from the condensing apparatus U by a pipe V connected to pipe R, or other form of fuel as coal dust, oil, natural gas, etc. This supplementary fuel will be required in first heating up the kiln before the operations of distillation and calcination are regularly established. When the kiln is operating normally, little or no supplementary fuel will be required, and it will be necessary only to blow in air, preferably pre-heated by well-known methods, through the pipe Q. The branch pipe R may lead from a source of gas supply as above indicated and discharge into the kiln in or through pipe Q. In the lower part of the kiln A A the combustion of the residual fixed carbon of the fuel takes place by the aid of the air blown in, and a very high temperature may be developed, depending on the character and amount of fuel mixed with the charge. The calcined products when they reach the lower end of the kiln are discharged through outlet W.

The principal condensable products of the distillation of bituminous fuel at moderate temperatures are oil, similar to crude petroleum, and ammonia. It is well known that there exists a serious and growing shortage of petroleum, the supply of which may be effectively supplemented by such use of bituminous fuels as will permit the recovery of their valuable by-products. The demand for ammonia for fertilizing and chemical purposes is also unlimited. The kiln herein described offers a practical method of utilizing bituminous fuels, including coal of such low grade as not to be ordinarily merchantable, in such manner that the heating value of the fuel may be applied to useful methods of calcination and its valuable by-products simply and economically recovered. It also makes possible the treatment of oil shale, cannel shale, peat, and coals high in ash, by themselves, these materials being simply crushed to the fineness found suitable and passed through the kiln as above described, the volatile products from these fuels being collected, the carbon consumed, and the inorganic residue calcined to a semi-fused clinker, which has been found a valuable aggregate in the making of cement concrete. Fire clay may also be calcined in this matter by admixture of fuel, and the calcined clay used as an ingredient of fire brick. The possible uses of the kiln, embodying the feature of recovery of valuable by-products, are therefore numerous and include applications in many lines of chemical industry.

What I claim and desire to protect by Letters Patent is as follows:

1. A revolving kiln consisting of an outer metal cylinder lined with refractory material and containing an inner cylinder attached to and revolving with the outer cylinder, extending through a part of the length of and concentrically placed in the outer cylinder, with space for passage of gases between the inner and outer cylinders, and means for drawing off and recovering volatilized products from the inner cylinder.

2. A revolving kiln consisting of an outer metal cylinder lined with refractory material, containing an inner cylinder attached to, revolving with and extending beyond the end of the outer cylinder and its discharge outlet for gases, extending through a part of the length of and concentrically placed in the outer cylinder, with space for passage of gases between the inner and outer cylinders and around the extension of the inner cylinder, and means for drawing off and recovering volatilized products from the inner cylinder.

3. A revolving kiln consisting of an outer metal cylinder lined with refractory material and containing an inner cylinder attached to and revolving with the outer cylinder, extending through a part of the length of and concentrically placed in the outer cylinder, with space for passage of gases divided into longitudinal flues between the inner and outer cylinders, and means for drawing off and recovering volatilized products from the inner cylinder.

4. A revolving kiln consisting of an outer metal cylinder lined with refractory material and containing an inner cylinder attached to and revolving with the outer cylinder, extending through a part of the length of and concentrically placed in the outer cylinder, with space for passage of gases divided into longitudinal flues between the inner and outer cylinders, means for introducing material containing carbonaceous fuel into the inner cylinder, and means for drawing off and recovering volatilized products from the inner cylinder.

5. A revolving kiln consisting of an outer metal cylinder lined with refractory material, a chamber at the end of said cylinder for the gases of combustion discharged therefrom, an inner cylinder extending through said chamber and concentrically into said outer cylinder part way of its length and so secured thereto as to rotate therewith, with space for the passage of gases between the inner and outer cylinders and around the extension of the inner cylinder in said chamber, and means for drawing off and recovering volatilized products from the inner cylinder.

6. A revolving kiln consisting of an outer metal cylinder lined with refractory material and containing an inner cylinder attached to and revolving with the outer cylinder, extending through a part of the length of and concentrically placed in the outer cylinder, with space for passage of gases divided into longitudinal flues between the inner and outer cylinders, means for introducing material containing carbonaceous fuel into the inner cylinder, means for drawing off volatilized products from the inner cylinder, and means for conveying combustible gas generated in the inner cylinder to the lower end of the kiln.

7. A revolving kiln consisting of an outer metal cylinder lined with refractory material and containing an inner cylinder attached to and revolving with the outer cylinder, extending through a part of the length of and concentrically placed in the outer cylinder with space for passage of gases divided into longitudinal flues between the inner and outer cylinders, means for introducing material containing carbonaceous fuel into the inner cylinder, means for drawing off volatilized products from the inner cylinder, and for drawing regulated amounts of products of combustion from the outer cylinder into the inner cylinder, and for conveying combustible gas generated in the inner cylinder to the lower end of the kiln.

8. A revolving kiln consisting of an outer metal cylinder lined with refractory material and containing an inner cylinder extending through a part of the length of and concentrically placed in the outer cylinder, with space for passage of gases divided into longitudinal flues between the inner and outer cylinders, means for introducing material containing carbonaceous fuel into the inner cylinders, means for drawing off volatilized products from the inner cylinder, and for drawing regulated amounts of products of combustion from the outer cylinder into the inner cylinder, and for conveying combustible gas generated in the inner cylinder to the lower end of the kiln, and means for supplying supplementary fuel and air to the lower end of the kiln.

9. A revolving kiln consisting of an outer metal cylinder lined with refractory material and containing an inner cylinder extending through a part of the length of and concentrically placed in the outer cylinder, with space for passage of gases divided into longitudinal flues between the inner and outer cylinders, means for introducing material containing carbonaceous fuel into the inner cylinder, means for drawing off volatilized products from the inner cylinder, and for drawing regulated amounts of products of combustion from the outer cylinder into the inner cylinder, and for conveying combustible gas generated in the inner cylinder to the lower end of the kiln, means for supplying supplementary fuel and air to the lower end of the kiln, and means for discharging calcined products at the lower end of the kiln.

10. A revolving kiln consisting of an outer metal cylinder lined with refractory material and containing an inner cylinder attached to, revolving with, and extending beyond the end of the outer cylinder, extending through a part of the length of and concentrically placed in the outer cylinder, with space for passage of gases between the inner and outer cylinders and around the extension of the inner cylinder, means for introducing material containing carbonaceous fuel into the inner cylinder, means for drawing off volatilized products from the inner cylinder, and for drawing regulated amounts of products of combustion from the outer cylinder into the inner cylinder, and for conveying combustible gas generated in the inner cylinder to the lower end of the kiln, means for supplying supplementary fuel and air to the lower end of the kiln, and means for discharging calcined products at the lower end of the kiln.

In testimony whereof I affix my signature.

SPENCER B. NEWBERRY.